(12) United States Patent
Unagami et al.

(10) Patent No.: US 12,229,757 B2
(45) Date of Patent: Feb. 18, 2025

(54) CONTROL METHOD, DATA STRUCTURE, SERVER, AND RECORDING MEDIUM

(71) Applicant: Panasonic Intellectual Property Corporation of America, Torrance, CA (US)

(72) Inventors: Yuji Unagami, Osaka (JP); Junji Michiyama, Fukuoka (JP); Yuuki Hirose, Osaka (JP); Tetsuji Fuchikami, Osaka (JP); Motoji Ohmori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 267 days.

(21) Appl. No.: 17/385,131

(22) Filed: Jul. 26, 2021

(65) Prior Publication Data
US 2021/0350365 A1    Nov. 11, 2021

Related U.S. Application Data

(63) Continuation of application No. PCT/JP2020/004679, filed on Feb. 6, 2020.
(Continued)

(51) Int. Cl.
*G06Q 20/38* (2012.01)
*G06Q 20/40* (2012.01)
(Continued)

(52) U.S. Cl.
CPC ..... *G06Q 20/38215* (2013.01); *G06Q 20/389* (2013.01); *G06Q 20/401* (2013.01);
(Continued)

(58) Field of Classification Search
CPC .......... G06Q 20/38215; G06Q 20/389; G06Q 20/401; G06Q 2220/00; H04L 9/008;
(Continued)

(56) References Cited

U.S. PATENT DOCUMENTS

| 2016/0012424 A1* | 1/2016 | Simon | G06Q 20/36 705/67 |
| 2017/0140408 A1* | 5/2017 | Wuehler | G06Q 30/0207 |

(Continued)

FOREIGN PATENT DOCUMENTS

| JP | 2018-136729 | 8/2018 | |
| WO | WO-2020080590 A1 * | 4/2020 | G06Q 20/065 |

OTHER PUBLICATIONS

International Search Report (ISR) issued on Apr. 28, 2020 in International (PCT) Application No. PCT/JP2020/004679.

*Primary Examiner* — Courtney P Jones
(74) *Attorney, Agent, or Firm* — Wenderoth, Lind & Ponack, L.L.P.

(57) ABSTRACT

A control method includes: receiving first transaction data related to a sign-up for service and storing the first transaction data received into the distributed ledger included in each of the plurality of servers, the service offering, if a goal condition predetermined for the service is satisfied, a token to a participant that is a user who signs up for the service; storing, into the distributed ledger, second transaction data indicating that the user is offered the token predetermined for the service, if it is determined that the goal condition is satisfied; and storing, into the distributed ledger, third transaction data indicating that the user is offered a deposit that is a temporary token predetermined for the service, at a
(Continued)

predetermined timing included in a period from the storing of the first transaction data into the distributed ledger until when determination of whether the goal condition is satisfied is performed.

13 Claims, 12 Drawing Sheets

Related U.S. Application Data

(60) Provisional application No. 62/802,861, filed on Feb. 8, 2019.

(51) Int. Cl.
*H04L 9/08* (2006.01)
*H04L 9/32* (2006.01)
*H04L 9/00* (2022.01)

(52) U.S. Cl.
CPC ............ *H04L 9/088* (2013.01); *H04L 9/3213* (2013.01); *G06Q 2220/00* (2013.01); *H04L 9/50* (2022.05); *H04L 2209/463* (2013.01); *H04L 2209/56* (2013.01)

(58) Field of Classification Search
CPC ... H04L 9/3213; H04L 9/50; H04L 2209/463; H04L 2209/56
USPC ............................................................ 705/75
See application file for complete search history.

(56) References Cited

U.S. PATENT DOCUMENTS

| | | |
|---|---|---|
| 2018/0158162 A1* | 6/2018 | Ramasamy ............... H04L 9/14 |
| 2018/0218343 A1* | 8/2018 | Kolb .................... G06Q 20/102 |
| 2019/0139032 A1* | 5/2019 | Heavey ................... G06Q 30/08 |
| 2019/0251629 A1* | 8/2019 | Gordon, III .......... G06Q 20/389 |
| 2019/0325486 A1* | 10/2019 | Fujimoto ............. G06Q 20/065 |
| 2020/0065847 A1* | 2/2020 | Harrison .............. G06Q 20/367 |
| 2020/0090140 A1* | 3/2020 | Seol ....................... G06Q 50/01 |
| 2020/0143014 A1* | 5/2020 | LeBeau .............. G06Q 20/3827 |
| 2020/0294100 A1* | 9/2020 | Yang ..................... G06Q 20/102 |
| 2021/0233048 A1* | 7/2021 | Park ..................... G06Q 20/065 |
| 2022/0005023 A1* | 1/2022 | Angelos .................... H04L 9/50 |

* cited by examiner

FIG. 3

Deposit issuance transaction data

| Deposit ID | Offer recipient ID | Deposit amount | Offering date and time |
|---|---|---|---|
| 67g4 | apa | 1 | 2018.10.05 10:00:30 |

| Remaining number of uses | Signature |
|---|---|
| 3 | 7328667g4723d9ec |

FIG. 4

Deposit offering transaction data

| Deposit ID | Offer source ID | Offer recipient ID | Deposit amount | Offering date and time |
|---|---|---|---|---|
| 67g4 | apa | apb | 1 | 2018.10.14 15:00:00 |

| Remaining number of uses | Signature |
|---|---|
| 2 | 8628342afbh23db49c |

FIG. 5

Deposit invalidation transaction data

| Deposit ID | Invalidation date and time | Signature |
|---|---|---|
| 67g4 | 2018.10.30 05:00:00 | afbh23d8628342b49c |

FIG. 6

Token offering transaction data

| Deposit ID | Offer source ID | Offer recipient ID | Token amount | Offering date and time |
|---|---|---|---|---|
| 10067g4 | apa | usx | 1 | 2018.10.30 05:00:00 |

| Signature |
|---|
| h238628342afbdb49c |

CONTROL METHOD, DATA STRUCTURE, SERVER, AND RECORDING MEDIUM

CROSS REFERENCE TO RELATED APPLICATIONS

This is a continuation application of PCT International Application No. PCT/JP2020/004679 filed on Feb. 6, 2020, designating the United States of America, which is based on and claims priority of U.S. Provisional Patent Application No. 62/802,861 filed on Feb. 8, 2019. The entire disclosures of the above-identified applications, including the specifications, drawings and claims are incorporated herein by reference in their entirety.

FIELD

The present disclosure relates to a control method, a data structure, a server, and a recording medium.

BACKGROUND

A system has been developed for providing one who achieves a predetermined condition with value information like a virtual currency in exchange for the achievement (see Patent Literature [PTL] 1).

CITATION LIST

Patent Literature

PTL 1: Japanese Unexamined Patent Application Publication No. 2018-136729

SUMMARY

Technical Problem

However, the aforementioned system does not provide a user with the value information before the predetermined condition is achieved. This leads to poor operating efficiency of the system, unfortunately. More specifically, although the system consumes power even in a period before the predetermined condition is achieved, the value information is not provided to the user in this period. Thus, power consumption efficiency of the system is low.

In response to this issue, the present disclosure provides a control method, and so on, that are capable of enhancing power consumption efficiency of a system.

Solution to Problem

A control method according to an aspect of the present disclosure is a control method executed by one of a plurality of servers included in a service management system, each of the plurality of servers including a distributed ledger, the control method including: receiving first transaction data that is transaction data related to a sign-up for service and storing the first transaction data received into the distributed ledger included in each of the plurality of servers, the service offering, if a goal condition predetermined for the service is satisfied, a token to a participant that is a user who signs up for the service; storing, into the distributed ledger, second transaction data that is transaction data indicating that the user is offered the token predetermined for the service, if it is determined that the goal condition is satisfied; and storing, into the distributed ledger, third transaction data that is transaction data indicating that the user is offered a deposit that is a temporary token predetermined for the service, at a predetermined timing included in a period from the storing of the first transaction data into the distributed ledger until when determination of whether the goal condition is satisfied is performed.

Note that these general and specific aspects may be implemented as a system, a device, an integrated circuit, a computer program, or a computer-readable recording medium such as a CD-ROM, or as any combination of a system, a device, an integrated circuit, a computer program, and a recording medium.

Advantageous Effects

The control method according to the present disclosure can enhance power consumption efficiency of a system.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 schematically illustrates deposit issuance transaction data according to the embodiment.

FIG. 4 schematically illustrates deposit offering transaction data according to the embodiment.

FIG. 5 schematically illustrates deposit invalidation transaction data according to the embodiment.

FIG. 6 schematically illustrates token offering transaction data according to the embodiment.

Figure 1:
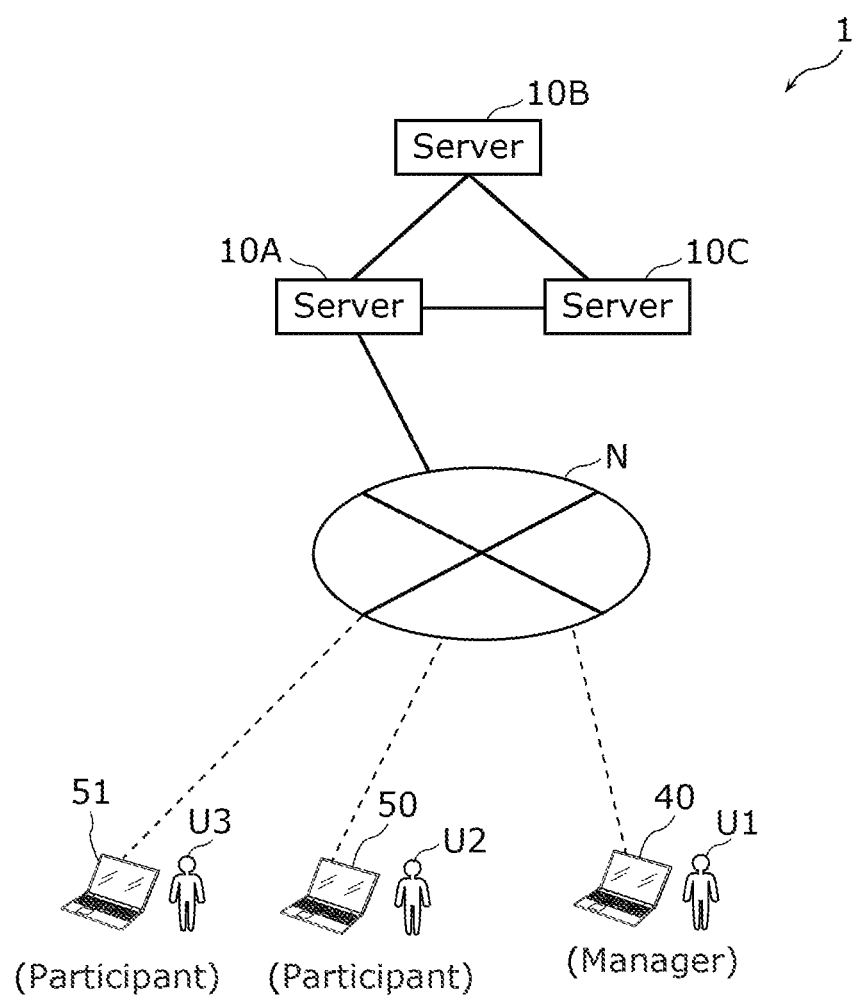
FIG. 1 is a schematic block diagram of a system according to an embodiment.

DESCRIPTION OF EMBODIMENT (Underlying Knowledge Forming Basis of the Present Disclosure)

In relation to the technology of the system disclosed in the Background section, the inventors have found the following problem.

A conventional system offers value information like a virtual currency if a predetermined condition is achieved. Examples of such system include crowdfunding.

Crowdfunding is a way of raising money for an investment or the like from participants via the Internet for instance, and then offering monetary returns on the investment to the participants.

However, the aforementioned system does not provide a user with the value information before the predetermined condition is achieved. This leads to poor operating efficiency of the system, unfortunately. More specifically, although the system consumes power even in a period before the predetermined condition is achieved, the value information is not provided to the user in this period. Thus, power consumption efficiency of the system is low.

In view of this, the present disclosure provides a control method, and so on, that are capable of enhancing the power consumption efficiency of the system.

A control method according to an aspect of the present disclosure is a control method executed by one of a plurality of servers included in a service management system and each including a distributed ledger. The control method includes: receiving first transaction data that is transaction data related to a sign-up for service and storing the first transaction data received into the distributed ledger included in each of the plurality of servers, the service offering, if a goal condition predetermined for the service is satisfied, a token to a participant that is a user who signs up for the service; storing, into the distributed ledger, second transaction data that is transaction data indicating that the user is offered the token predetermined for the service, if it is determined that the goal condition is satisfied; and storing, into the distributed ledger, third transaction data that is transaction data indicating that the user is offered a deposit that is a temporary token predetermined for the service, at a predetermined timing included in a period from the storing of the first transaction data into the distributed ledger until when determination of whether the goal condition is satisfied is performed.

According to the above aspect, the system offers, to the user, the deposit as the temporary token corresponding to a token that is value information to be offered in the future, in a period before the goal condition is achieved. The deposit may be managed in the distributed ledger to be used in the same or similar manner as the token is. This enables the system to offer the value information to the user in the period before the goal condition is achieved, thereby enhancing power consumption efficiency of the system. Thus, the control method according to the present disclosure is capable of enhancing the power consumption efficiency of the system.

Moreover, it is substantially impossible for the transaction data stored in the distributed ledger to be falsified. Thus, the management information related to the deposit offering is appropriately managed by the system. If the management information were to be falsified, this may cause inappropriate distribution of the value information, such as deposit or token. However, the control method according to the aspect of the present disclosure stores the management information into the distributed ledger, so that falsification is substantially impossible. Hence, the control method according to the aspect of the present disclosure also has an advantageous effect of appropriately managing the distribution of the value information, such as deposit or token.

For example, the control method may further include, after the storing of the third transaction data into the distributed ledger, storing, into the distributed ledger, fourth transaction data that is transaction data indicating that the deposit is offered from a holder of the deposit to an offer recipient that receives the deposit.

According to the above aspect, the system is further capable of offering the deposit to the offer recipient and thereby distributing among users the value information offered to the participant. Such distribution of the value information enables the system to further enhance the power consumption efficiency. Hence, the control method according to the aspect of the present disclosure is capable of further enhancing the power consumption efficiency of the system.

For example, the control method may further include, if it is determined that the goal condition is satisfied or if it is determined that the goal condition is unsatisfied, after the storing of the third transaction data into the distributed ledger, storing, into the distributed ledger, fifth transaction data that is transaction data for invalidating the deposit.

According to the above aspect, the system is capable of invalidating the deposit if the goal condition is unsatisfied, and thereby appropriately controlling the validity of the deposit. Hence, the control method according to the present disclosure is capable of appropriately managing the distribution of the value information as well as further enhancing the power consumption efficiency of the system.

For example, the control method may further include, if it is determined that the goal condition is satisfied after the storing of the third transaction data into the distributed ledger, storing, into the distributed ledger, sixth transaction data that is transaction data for offering a token corresponding to the deposit to a holder of the deposit.

According to the above aspect, the system is capable of offering the token corresponding to the deposit if the goal condition is satisfied, and thus also performing management so that the deposit is converted into the token after the goal condition is satisfied. Hence, the control method according to the present disclosure is capable of further appropriately managing the distribution of the value information as well as further enhancing the power consumption efficiency of the system.

For example, the control method may further include, if it is determined that the goal condition is satisfied after the storing of the third transaction data into the distributed ledger, notifying a holder of the deposit that the goal condition is satisfied.

According to the above aspect, the system is capable of providing a notification that the goal condition is satisfied, and thereby encouraging action (that is, exchange) for converting the deposit into the token after the goal condition is satisfied. Hence, the control method according to the present disclosure is capable of further appropriately managing the distribution of the value information as well as further enhancing the power consumption efficiency of the system.

For example, the control method may further include, if a holder of the deposit is not the participant and it is determined that the goal condition is unsatisfied after the storing of the third transaction data into the distributed ledger, storing, into the distributed ledger, seventh transaction data that is transaction data for offering a token corresponding to the deposit from the participant to the holder.

According to the above aspect, the system is capable of performing, if the goal condition is satisfied, management so that the token converted from the deposit owned by the holder different from the participant appears to be offered from the participant. If the deposit held by the holder were to simply disappear, this may cause inappropriate distribution of the value information. Hence, the control method according to the present disclosure is capable of further appropriately managing the distribution of the value information as well as further enhancing the power consumption efficiency of the system.

For example, the storing of the fourth transaction data into the distributed ledger may include limiting the storing of the fourth transaction data into the distributed ledger if a total number of times the deposit is offered exceeds a predetermined total number of times.

According to the above aspect, the system is capable of performing management so that the number of times the deposit is offered does not exceed the predetermined number of times. This management limits a range of the deposit offering because the deposit is allowed to be used as a token only in a period before the goal condition is satisfied. Hence, the control method according to the present disclosure is capable of further appropriately managing the distribution of the value information as well as further enhancing the power consumption efficiency of the system.

For example, the storing of the third transaction data into the distributed ledger may include storing of the third transaction data into the distributed ledger through a smart contract that is executed in response to the storing of the first transaction data into the distributed ledger.

According to the above aspect, the system performs the deposit offering early and safely without any intervention of another person or another system. Hence, the control method according to the present disclosure is capable of performing the processing early and safely as well as enhancing the power consumption efficiency of the system.

For example, the storing of the transaction data into the distributed ledger included in each of the plurality of servers includes storing the transaction data into the distributed ledger through execution of a consensus algorithm by each of the plurality of servers.

According to the above aspect, the system stores the distributed ledger through the execution of the consensus algorithm. Hence, the control method according to the present disclosure more easily enables enhancement of the power consumption efficiency of the system by the execution of the consensus algorithm.

Furthermore, a data structure according to an aspect of the present disclosure is a data structure used by a service management system including a plurality of servers each of which includes a distributed ledger. The data structure includes: identification information that uniquely identifies a deposit that is a temporary token predetermined for service; identification information that uniquely identifies an offer recipient that receives the deposit; information that indicates an amount of the deposit; and an electronic signature of an issuer of the deposit.

According to the above aspect, the same advantageous effect as in the above service management system can be produced.

Furthermore, a server according to an aspect of the present disclosure is a server among a plurality of servers included in a service management system and each including a distributed ledger. The server includes: a processor; and a controller. The processor receives first transaction data related to a sign-up for service and stores the first transaction data received into the distributed ledger included in each of the plurality of servers. The service offers, if a goal condition predetermined for the service is satisfied, a token to a participant that is a user who signs up for the service. The controller: stores, into the distributed ledger, second transaction data indicating that the user is offered the token predetermined for the service, if determining that the goal condition is satisfied; and stores, into the distributed ledger, third transaction data indicating that the user is offered a deposit that is a temporary token predetermined for the service, at a predetermined timing included in a period from when storing the first transaction data into the distributed ledger until when determining whether the goal condition is satisfied.

According to the above aspect, the same advantageous effect as in the above control method can be produced.

Furthermore, a recording medium according to an aspect of the present invention is a non-transitory computer-readable recording medium having recorded thereon a program for causing a computer to execute the above-described control method.

According to the above aspect, the same advantageous effect as in the above control method can be produced.

Furthermore, a data structure according to another aspect of the present disclosure is a data structure that is recorded into a distributed ledger included in each of a plurality of servers in a service management system. The data structure includes: a first ID that is valid only in a period predetermined for service and that indicates a deposit as a temporary token offered to a participant that signs up for the service; an amount of the deposit; a use condition of the deposit; and a second ID that indicates the participant. After being recorded into the distributed ledger, the data structure is used for offering the deposit to the participant.

According to the above aspect, the same advantageous effect as in the above service management system can be produced.

Note that these general and specific aspects may be implemented as a system, a device, an integrated circuit, a computer program, or a computer-readable recording medium such as a CD-ROM, or as any combination of a system, a device, an integrated circuit, a computer program, and a recording medium.

Exemplary embodiments will be described in detail below with reference to the drawings.

Note that each of the embodiments described below shows a generic or specific example. The numerical values, shapes, materials, structural components, the arrangement and connection of the structural components, steps, the processing order of the steps, etc., shown in the following embodiments are mere examples, and thus are not intended to limit the present disclosure. Among the structural components described in the following embodiments, structural components not recited in any one of the independent claims that indicate the broadest concepts will be described as optional structural components.

EMBODIMENT

The present embodiment describes a system and a control method used by the system that are capable of enhancing power consumption efficiency of the system.

This system provides service to a participant. The service offers, if a goal condition predetermined for this service is satisfied, value information to the participant, namely, a user who signs up for this service. In the present embodiment, a token is described as an example of the value information. Examples of such service include crowdfunding, which is described as an example in the present embodiment. However, the service may be a financial product, such as deposit, insurance, or investment.

A unit of funding for crowdfunding is also referred to as a project. A project is assumed to raise money for an investment or the like from participants and then offer monetary returns on the investment to the participants. The following describes a project where: one who manages the project is referred to as a manager; and one who signs up to participate in the funding is referred to as a participant. The manager solicits for funding, and manages value information. If sign-ups for the funding meet a predetermined goal amount during a solicitation period predetermined for the project, this project is phrased as achieving "success" or being "successful".

FIG. 1 is a schematic block diagram illustrating a configuration of system 1 according to the present embodiment.

As illustrated in FIG. 1, system 1 includes servers 10A, 10B, and 10C and terminals 40, 50, and 51. These devices included in system 1 are communicably connected to each other via network N. Network N may use any kind of communication line or network. Examples include the Internet and a mobile phone carrier network. Servers 10A, 10B, and 10C may also referred to as "servers 10A etc."

Server 10A is one of a plurality of servers 10A, 10B, and 10C that manage crowdfunding performed by system 1. Server 10A is one of the plurality of servers 10A, 10B, and 10C each of which holds a distributed ledger. The distributed ledger held by server 10A stores various kinds of transaction data relating to procedures or processing for crowdfunding. By receiving the transaction data, server 10A receives the procedure or processing related to deposits and tokens for the crowdfunding.

Note that the funding for the project is managed as token offering in the distributed ledger, as an example. A token refers to value information managed in the distributed ledger. A token corresponds to, or is exchangeable with, money, a gift certificate, or a coupon, for instance.

A deposit refers to a temporary token and is usable until a token (also referred to as a true token) is offered in response to satisfaction of the goal condition. More specifically, an issued deposit is managed to be valid until a token is offered and then be invalid after the token is offered. The deposit may refer to value information that is temporarily deposited with the user by system 1.

Each of servers 10B and 10C has the same function as server 10A and operates independently of server 10A. The number of servers is not limited to three and may be at least two. Servers 10A etc. are communicably connected to each other, and may be connected via network N.

The present embodiment describes a case where server 10A, out of servers 10A etc., receives transaction data from terminal 40 for example and transmits a notification to terminal 40 for example. However, the other server (server 10B or 10C) may perform these operations instead.

Terminal 40 is a terminal device owned by the manager. The manager determines a solicitation period of a project and a goal amount of the project. The manager enters the determined solicitation period and goal amount in system 1 via terminal 40. Then, the manager solicits for funding from participants so that a total amount achieved by sign-ups for the funding from the participants reaches the goal amount. Terminal 40 is a personal computer, a smartphone, or a tablet, for example.

Terminal 50 is a terminal device owned by a participant. The participant uses terminal 50 to sign up for the funding by reference to information about funding solicitation. The participant is offered a deposit before the project achieves success. The deposit offered may be offered to another person from the participant. One who holds the deposit (i.e., a holder) is offered a token if the project is successful. The participant may offer a fund to the manager when signing up for the funding.

Terminal 51 is a terminal device owned by a participant who signs up for the funding but is different from the participant owning terminal 50. Terminal 51 has the same function as terminal 50 and operates independently of terminal 50. Note that the number of terminals owned by the participants is not limited to two and that the number of terminals is equal to the number of participants.

The following describes in details configurations of servers 10A, etc., included in system 1.

Figure 2:
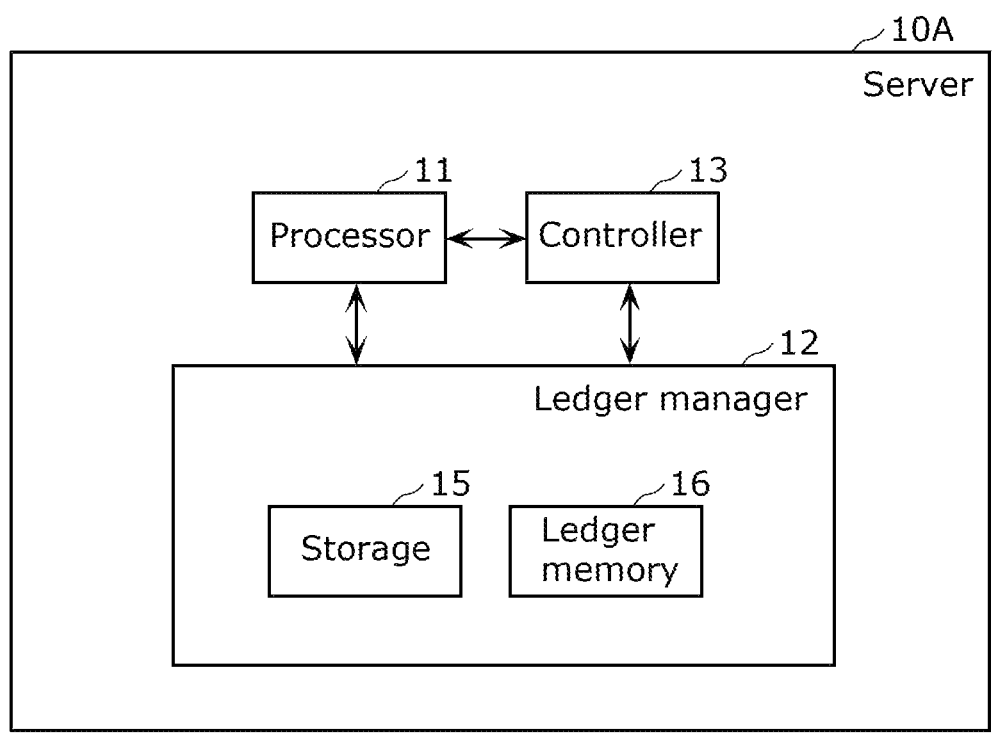
FIG. 2 is a schematic block diagram of a server according to the embodiment.

FIG. 2 is a schematic block diagram illustrating a configuration of server 10A according to the present embodiment.

As illustrated in FIG. 2, server 10A includes processor 11, ledger manager 12, and controller 13. These functional components included in server 10A may be implemented by a central processing unit (CPU) executing a program using a memory, for example.

Processor 11 manages various kinds of information using the distributed ledger. If receiving the transaction data from a device included in system 1 or if obtaining the transaction data generated by controller 13, processor 11 stores the received or obtained transaction data into the distributed ledger by providing this transaction data to ledger manager 12. The transaction data includes deposit issuance transaction data, deposit offering transaction data, deposit invalidation transaction data, and token offering transaction data. These pieces of transaction data are described in detail below.

Ledger manager 12 is a processor that manages the distributed ledger. Ledger manager 12 stores the transaction data provided by processor 11 into the distributed ledger. The distributed ledger stores the transaction data from past to present. Information recorded in a distributed ledger has characteristics of being less subject to falsification. This allows the aforementioned transaction data to be managed to avoid falsification.

Ledger manager 12 includes storage 15 and ledger memory 16.

Storage 15 is a processor that stores new transaction data, which is to be stored into the distributed ledger, into ledger memory 16. Storage 15 stores the new transaction data into ledger memory 16 according to an algorithm depending on a type of the distributed ledger. Moreover, storage 15 transmits and receives communication data to and from storage 15 of a different server among servers 10A etc. and stores the aforementioned new transaction data into ledger memory 16 of this different server as well. For example, if the distributed ledger is a blockchain, storage 15 generates a block including the new transaction data. Then, after achieving synchronization of the generated block among servers 10A, etc., storage 15 stores this block into ledger memory 16.

Ledger memory 16 is a memory device that stores the distributed ledger. The distributed ledger stored in ledger memory 16 stores at least one piece of transaction data, and is managed to be less subject to falsification by taking advantage of characteristics of a hash value for example (described below).

The distributed ledger is a blockchain for example, and the present embodiment describes such a case. However, a distributed ledger based on a different algorithm (such as IOTA or hashgraph) may be adopted. Note that the distributed ledger may or may not execute a consensus algorithm (such as Practical Byzantine Fault Tolerance [PBFT], Proof of Work [PoW], or Proof of Stake [PoS]) to store new data. Examples of distributed ledger technology that executes no consensus algorithm include Hyperledger Fabric.

Controller 13 is a processor that determines whether the goal condition of the crowdfunding project is achieved and that controls deposit and token.

Controller 13 receives the goal condition of the crowdfunding from terminal 40. Moreover, controller 13 receives a sign-up for funding from terminals 50 and 51. Controller 13 determines whether the goal condition of the crowdfunding is satisfied.

If determining that the goal condition is satisfied, controller 13 stores, into the distributed ledger, token offering transaction data (corresponding to second transaction data) indicating that a token predetermined for the service is offered to the participant.

For deposit control, controller 13 controls deposit offering and deposit validity. More specifically, controller 13 offers a deposit predetermined for the service to the participant at a predetermined timing included in a period from when storing the sign-up transaction data into the distributed ledger until when determining whether the goal condition is satisfied. To offer the deposit to the participant, controller 13 stores, into the distributed ledger, deposit issuance transaction data (corresponding to third transaction data) indicating that the deposit is offered. The predetermined timing may be a timing at which it is determined that a condition for offering the deposit to the participant (also referred to as a deposit issuance condition) is satisfied. To be more specific, to offer the deposit to the participant, controller 13 may determine beforehand whether the deposit issuance condition is satisfied and, if so, offer the deposit to the participant. Here, the deposit offering from system 1 to the participant may also be phrased as "issuance".

For example, the deposit issuance condition may be that a predetermined number of pieces of sign-up transaction data are received or that an increase rate of the number of pieces of sign-up transaction data received exceeds a predetermined rate. Either of these examples is applicable because, under such condition, a probability is relatively high that the goal condition is determined as being satisfied.

Moreover, to control the deposit offering, controller 13 is also capable of controlling deposit offering from the user to another user. More specifically, after storing the deposit issuance transaction data into the distributed ledger, controller 13 stores, into the distributed ledger, deposit offering transaction data (corresponding to fourth transaction data) indicating that the deposit is offered from the holder of the deposit to an offer recipient that receives the deposit.

To control the deposit validity refers to controlling whether to treat the deposit as a valid or invalid deposit. Immediately after the deposit issuance transaction data is stored into the distributed ledger, the issued deposit is managed as a valid deposit. Then, when the token offering transaction data by which the token corresponding to this deposit is offered in response to the satisfaction of the goal condition is stored into the distributed ledger, the deposit is managed as an invalid deposit.

More specifically, if it is determined that the goal condition is satisfied or is to be unsatisfied, controller 13 invalidates the deposit. To invalidate the deposit, controller 13 stores deposit invalidation transaction data (corresponding to fifth transaction data) indicating that the deposit is invalidated, into the distributed ledger.

If the goal condition is satisfied after the deposit is offered, controller 13 performs management so that the deposit is converted into a true token. To be more specific, if determining that the goal condition is satisfied after storing the deposit issuance transaction data into the distributed ledger, controller 13 stores, into the distributed ledger, token offering transaction data (corresponding to sixth transaction data) indicating that a token corresponding to the deposit is offered to the holder of the deposit.

Here, if the goal condition is satisfied after the deposit is offered, controller 13 may provide a notification (more specifically, a notification encouraging a procedure for converting the deposit into the true token) to the holder of the deposit. To be more specific, if determining that the goal condition is satisfied after storing the deposit issuance transaction data into the distributed ledger, controller 13 may provide the notification to the holder of the deposit.

Assume that, after the deposit is offered, the goal condition is unsatisfied after the deposit is offered to another user (also referred to as a holder) different from the participant. In this case, controller 13 may perform management so that the deposit of the holder is converted into the true token and also that a token corresponding to the deposit of the holder is collected from the participant. Thus, controller 13 may perform management so that the token corresponding to the deposit of the holder is offered from the participant to the holder. More specifically, if determining that the goal condition is unsatisfied after storing the deposit issuance transaction data into the distributed ledger when the holder of the deposit is not the participant, controller 13 stores, into the distributed ledger, token offering transaction data (corresponding to seventh transaction data) indicating that a token corresponding to the deposit is offered from the participant to the holder.

Note that controller 13 may limit the number of times the deposit is offered. More specifically, assume that the number of times the deposit is offered exceeds a predetermined number of times when the deposit offering transaction data is to be stored into the distributed ledger. In this case, controller 13 may restrict storing of the deposit offering transaction data into the distributed ledger.

A part or a whole of the aforementioned processing of controller 13 may be achieved by a smart contract implemented by executing a contract code stored in ledger memory 16. However, this is not intended to be limiting. For example, the deposit offering may be performed by a smart contract that is executed in response to the storing of the first transaction data into the distributed ledger.

The following describes the transaction data of each kind.

FIG. 3 schematically illustrates deposit issuance transaction data according to the present embodiment. The deposit issuance transaction data illustrated in FIG. 3 is generated by servers 10A etc. for issuing a deposit.

The deposit issuance transaction data illustrated in FIG. 3 includes a deposit ID, an offer recipient ID, a deposit amount, an issuance date and time, a remaining number of uses, and a signature.

The deposit ID is an identifier that uniquely identifies the deposit issued through the deposit issuance transaction data.

The offer recipient ID is an identifier that uniquely identifies the user who is offered the deposit issued through the deposit issuance transaction data.

The deposit amount is information indicating a figure of the deposit (or an amount of the deposit) issued through the deposit issuance transaction data.

The issuance date and time is information indicating a date and time when the deposit is issued through the deposit issuance transaction data.

The remaining number of uses is information indicating the number of times the deposit issued through the deposit issuance transaction data is allowed to be used. The term "uses" refers to offering of the deposit for example. In this case, the remaining number of uses indicates the number of times the deposit is allowed to be offered. Here, the remaining number of uses is an example of limitation information indicating a condition assigned to the deposit to be issued or offered. In addition to the remaining number of uses, the limitation information may include information indicating a ratio of the deposit to be further offered with respect to the deposit offered through the deposit offering transaction data.

The signature is an electronic signature added by the device or person that generates the deposit issuance transaction data.

The deposit issuance transaction data illustrated in FIG. 3 is used for issuing the deposit having the deposit ID "67g4" to user apa. The amount of the deposit issued is "1", and the issuance date and time of this deposit is "2018. 10. 05 10:00:30". The remaining number of uses of the deposit is "3". The signature is an electronic signature of server 10A, for example. Here, the user having the user ID "apa" is described as "user apa". This manner of description is also adopted in the following.

The deposit issuance transaction data illustrated in FIG. 3 may be a data structure used in a service management system including a plurality of servers each including a distributed ledger. The data structure may include: identification information uniquely identifying a deposit that is a temporary token predetermined for service; identification information uniquely identifying an offer recipient that is offered the deposit; and information indicating an amount of the deposit; and an electronic signature of an issuer of the deposit.

Furthermore, the deposit issuance transaction data illustrated in FIG. 3 may be a data structure recorded into a distributed ledger included in each of a plurality of servers in a service management system. The data structure may include: a first ID that is valid only in a period predetermined for service and that indicates a deposit as a temporary token offered to a participant that signs up for the service; an amount of the deposit; a use condition of the deposit; and a second ID that indicates the participant. After recorded into the distributed ledger, the data structure may be used for offering the deposit to the participant.

FIG. 4 schematically illustrates deposit offering transaction data according to the present embodiment. The deposit offering transaction data is generated by servers 10A etc. for offering a deposit.

The deposit offering transaction data illustrated in FIG. 4 includes a deposit ID, an offer source ID, an offer recipient ID, a deposit amount, an offering date and time, a remaining number of uses, and a signature.

The deposit ID is an identifier that uniquely identifies the deposit offered through the deposit offering transaction data.

The offer source ID is an identifier that uniquely identifies the user who is an offer source of the deposit offered through the deposit offering transaction data.

The offer recipient ID is an identifier that uniquely identifies the user who is offered the deposit through the deposit offering transaction data.

The deposit amount is information indicating a figure of the deposit (or an amount of the deposit) offered through the deposit offering transaction data.

The offering date and time is information indicating a date and time when the deposit is offered through the deposit offering transaction data.

The remaining number of uses is information indicating the number of times the deposit offered through the deposit offering transaction data is allowed to be used. The remaining number of uses is an example of limitation information indicating a condition assigned to the deposit to be offered. The limitation information may include information indicating a ratio of the deposit to be further offered after the deposit is offered through this deposit offering transaction data.

The signature is an electronic signature added by the device or person that generates the deposit offering transaction data.

The deposit offering transaction data illustrated in FIG. 4 is used for offering the deposit having the deposit ID "67g4" from user apa to user apb. The amount of the deposit offered is "1", and the offering date and time of this deposit is "2018. 10. 14 15:00:00". The remaining number of uses of the deposit is "2". The signature is an electronic signature of the offer source "apa".

FIG. 5 schematically illustrates deposit invalidation transaction data according to the present embodiment. The deposit invalidation illustrated in FIG. 5 is generated by servers 10A etc. for invalidating the deposit.

The deposit invalidation transaction data illustrated in FIG. 5 includes a deposit ID, an invalidation date and time, and a signature.

The deposit ID is an identifier that uniquely identifies the deposit invalidated through the deposit invalidation transaction data.

The invalidation date and time indicating a date and time when the deposit is invalidated through the deposit invalidation transaction data.

The signature is an electronic signature added by the device or person that generates the deposit invalidation transaction data.

The deposit invalidation transaction data illustrated in FIG. 5 is used for invalidating the deposit having the deposit ID "67g4". The invalidation date and time of this deposit is "2018. 10. 30 05:00:00". The signature is an electronic signature of service 10A, for example.

FIG. 6 schematically illustrates token offering transaction data according to the present embodiment. The token offering transaction data illustrated in FIG. 6 is generated by servers 10A etc. for offering a token.

The token offering transaction data illustrated in FIG. 6 includes a token ID, an offer source ID, an offer recipient ID, a token amount, an offering date and time, and a signature.

The token ID is an identifier that uniquely identifies the token offered through the token offering transaction data.

The offer source ID is an identifier that uniquely identifies the user who is an offer source of the token offered through the token offering transaction data.

The offer recipient ID is an identifier that uniquely identifies the user who is an offer recipient of the token offered through the token offering transaction data.

The token amount is information indicating a figure of the token (or an amount of the token) offered through the token offering transaction data.

The offering date and time is information indicating a date and time when the token is offered through the token offering transaction data.

The signature is an electronic signature added by the device or person that generates the token offering transaction data.

The token offering transaction data illustrated in FIG. 6 is used for offering the token having the token ID "10067g4" from user apa to user usx. The amount of the token offered is "1", and the offering date and time of this token is "2018. 10. 30 05:00:00". The signature is an electronic signature of service 10A, for example.

The following describes operations performed by system 1 and servers 10A etc. having the configurations described above.

Figure 7:
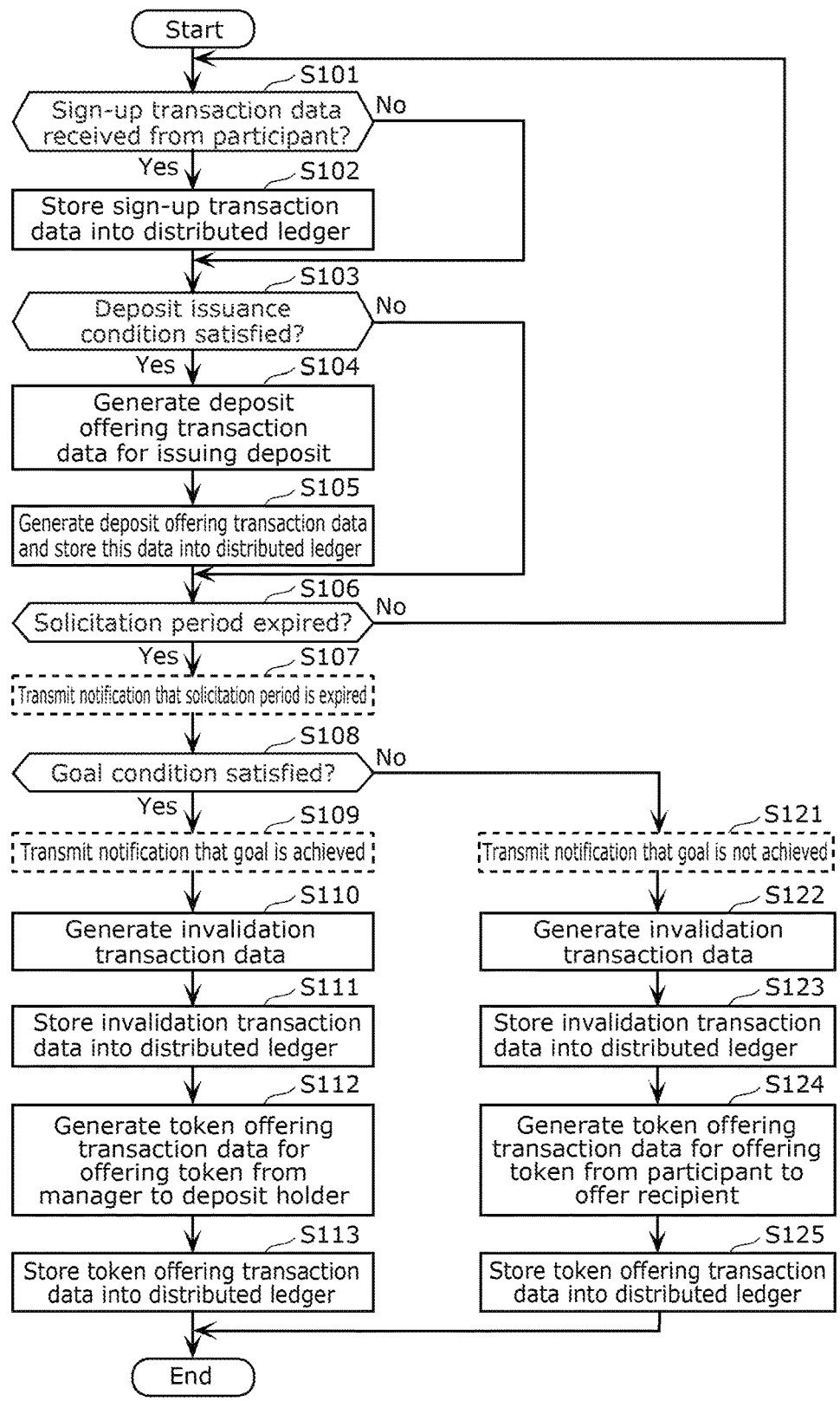
FIG. 7 is a flowchart illustrating a first example of processing performed by the server according to the embodiment.

FIG. 7 is a flowchart illustrating a first example of processing performed by servers 10A etc. according to the present embodiment. Assume that controller 13 has already obtained the goal condition from terminal 40 of manager U1 at the start of this flowchart illustrated in FIG. 7.

As illustrated in FIG. 7, processor 11 determines whether sign-up transaction data is received from terminal 50 of participant U2, in Step S101. If the sign-up transaction data is received (Yes in Step S101), processor 11 proceeds to Step S102. Otherwise (No in Step S101), processor 11 proceeds to Step S103.

In Step S102, processor 11 stores the sign-up transaction data received in Step S101 into the distributed ledger by providing this sign-up transaction data to ledger manager 12. Moreover, processor 11 transmits the sign-up transaction data to other servers 10B etc. so that the sign-up transaction data is stored into all the distributed ledgers of servers 10A etc.

In Step S103, controller 13 determines whether the deposit issuance condition is satisfied. If determining that the deposit issuance condition is satisfied (Yes in Step S103), controller 13 proceeds to Step S104. Otherwise (No in Step S103), controller 13 proceeds to Step S106.

In Step S104, controller 13 generates deposit offering transaction data for issuing a deposit.

In Step S105, controller 13 stores the deposit offering transaction data generated in Step S104 into the distributed ledger by providing this deposit offering transaction data to ledger manager 12. Moreover, controller 13 transmits the deposit offering transaction data to other servers 10B etc. so that the deposit offering transaction data is stored into all the distributed ledgers of servers 10A etc. After this, the offered deposit can be offered to another user. Processing performed for offering the deposit to another user is described later.

In Step S106, controller 13 determines whether the solicitation period is expired. Whether the solicitation period is expired is determined by determining whether a predetermined solicitation expiry date is reached. If determining that the solicitation period is expired (Yes in Step S106), controller 13 proceeds to Step S107. Otherwise (No in Step S106), controller 13 proceeds to Step S101.

In Step S107, controller 13 notifies participant U3 for instance, or more specifically terminal 50 for instance, that the solicitation period is expired. Note that Step S107 may not be executed.

In Step S108, controller 13 determines whether the goal condition of the crowdfunding project is satisfied. If determining that the goal condition is satisfied (Yes in Step S108), controller 13 proceeds to Step S109. Otherwise (No in Step S108), controller 13 proceeds to Step S121.

In Step S109, controller 13 notifies participant U3 for instance, or more specifically terminal 50 for instance, that the goal condition is satisfied. Note that Step S109 may not be executed.

In Step S110, controller 13 generates invalidation transaction data for invalidating the deposit.

In Step S111, controller 13 stores the invalidation transaction data generated in Step S110 into the distributed ledger by providing this invalidation transaction data to ledger manager 12. Moreover, controller 13 transmits the invalidation transaction data to other servers 10B etc. so that the invalidation transaction data is stored into all the distributed ledgers of servers 10A etc.

In Step S112, controller 13 generates token offering transaction data for offering a token from the manager to the holder of the deposit. In the generated token offering transaction data, the amount of token offered corresponds to the amount of deposit held by the holder.

In Step S113, controller 13 stores the token offering transaction data generated in Step S112 into the distributed ledger by providing this token offering transaction data to ledger manager 12. Moreover, controller 13 transmits the token offering transaction data to other servers 10B etc. so that the token offering transaction data is stored into all the distributed ledgers of servers 10A etc.

In Step S121, controller 13 notifies participant U3 for instance, or more specifically terminal 50 for instance, that the goal condition is unsatisfied. Note that Step S121 may not be executed.

In Step S122, controller 13 generates invalidation transaction data for invalidating the deposit.

In Step S123, controller 13 stores the invalidation transaction data generated in Step S122 into the distributed ledger by providing this invalidation transaction data to ledger manager 12. Moreover, controller 13 transmits the invalidation transaction data to other servers 10B etc. so that the invalidation transaction data is stored into all the distributed ledgers of servers 10A etc.

In Step S124, controller 13 generates token offering transaction data for offering the token from the participant to an offer recipient. In the generated token offering transaction data, the amount of token offered corresponds to the amount of deposit held by the offer recipient.

In Step S125, controller 13 stores the token offering transaction data generated in Step S124 into the distributed ledger by providing this token offering transaction data to ledger manager 12. Moreover, controller 13 transmits the token offering transaction data to other servers 10B etc. so that the token offering transaction data is stored into all the distributed ledgers of servers 10A etc.

After Step S113 or S125, a series of steps illustrated in FIG. 7 ends.

Figure 8:
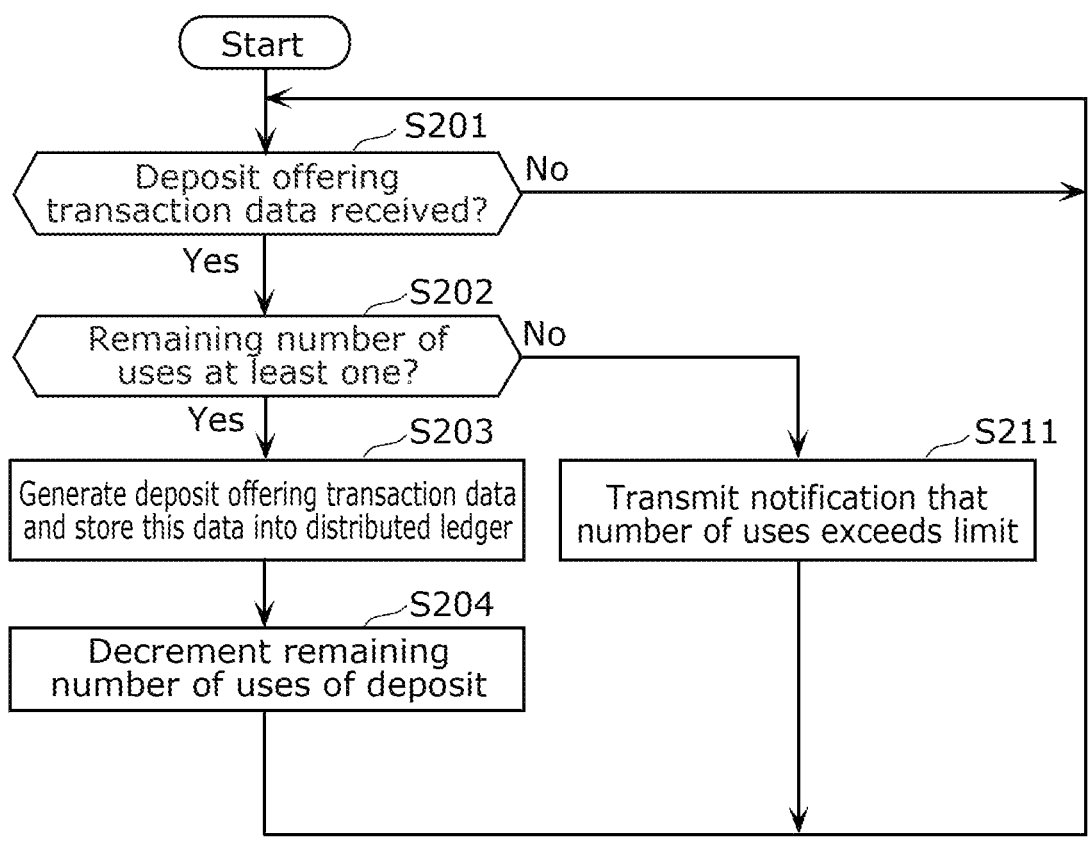
FIG. 8 is a flowchart illustrating a second example of processing performed by the server according to the embodiment.

FIG. 8 is a flowchart illustrating a second example of processing performed by server 10A according to the present embodiment.

The processing illustrated in FIG. 8 is performed concurrently with the processing illustrated in FIG. 7, in a period from when the deposit is issued (Step S105 in FIG. 7) and until when the deposit is invalidated (Step S111 or S123 in FIG. 7).

In Step S201, processor 11 determines whether deposit offering transaction data is received from terminal 50 of participant U2 for instance. If receiving the deposit offering transaction data (Yes in Step S201), processor 11 proceeds to Step S202. Otherwise (No in Step S201), processor 11 executes Step S201 again. More specifically, processor 11 waits at Step S201 until the deposit offering transaction data is received.

In Step S202, controller 13 determines whether the remaining number of uses is at least one, by reference to the remaining number of uses included in the deposit offering transaction data received in Step S201. If determining that the remaining number of uses is at least one (Yes in Step S202), controller 13 proceeds to Step S203. Otherwise (No in Step S202), controller 13 proceeds to Step S211.

In Step S203, processor 11 stores the deposit offering transaction data received in Step S201 into the distributed ledger by providing this deposit offering transaction data to ledger manager 12. Moreover, processor 11 transmits the deposit offering transaction data to other servers 10B etc. so that the deposit offering transaction data is stored into all the distributed ledgers of servers 10A etc.

In Step S204, controller 13 decrements by one the remaining number of uses of the deposit related to the deposit offering transaction data received in Step S201. After executing Step S204, controller 13 proceeds to Step S201.

In Step S211, controller 13 notifies the offer source that the number of uses exceeds the limit. Here, controller 13 may store, into the distributed ledger, that the number of uses exceeds the limit. After executing Step S211, controller 13 proceeds to Step S201.

If the limit for the number of uses of the deposit is not managed, Steps S202, S204, and S211 are not to be executed.

Next, system-wide processing of system 1 is described.

Figure 9:
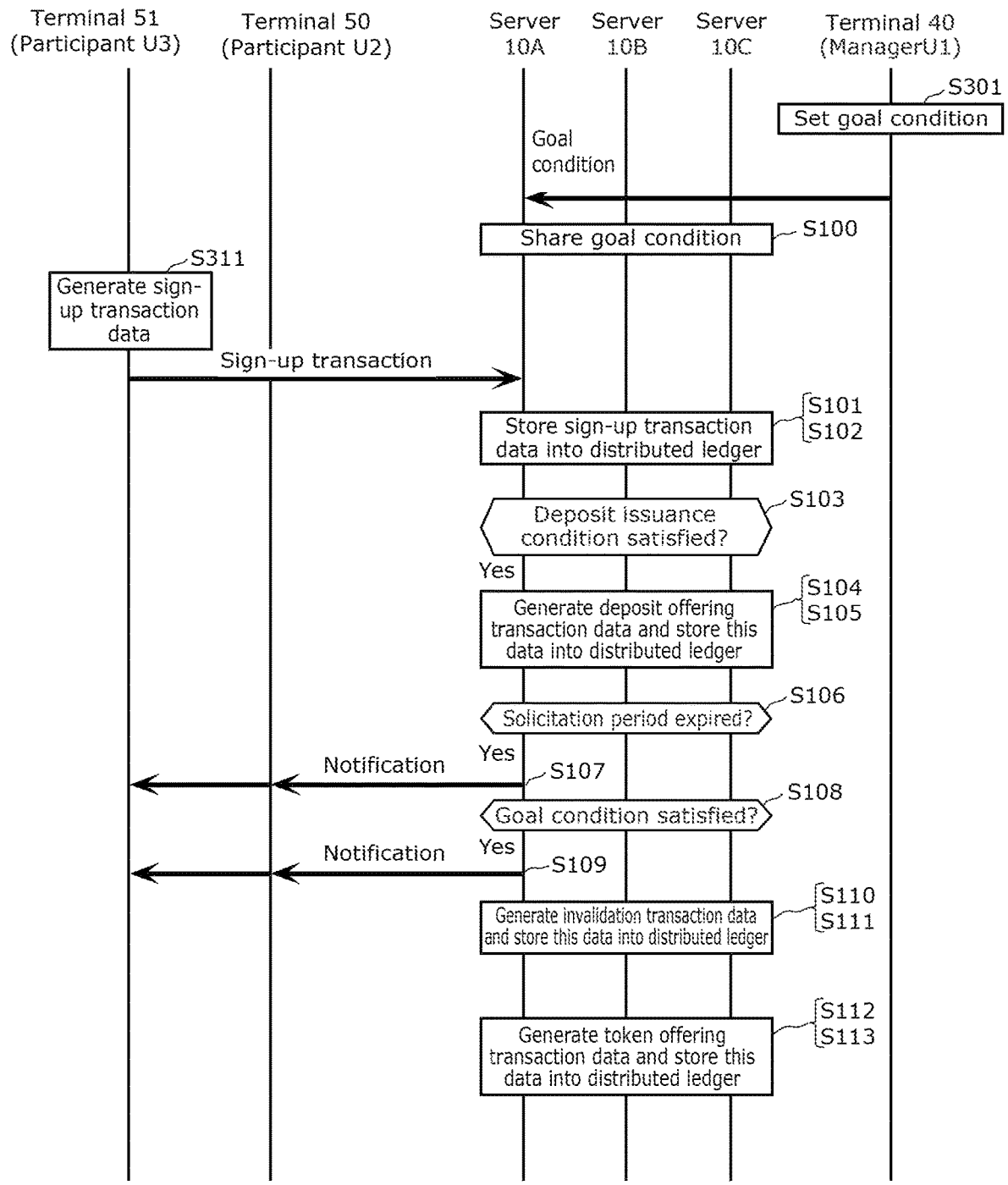
FIG. 9 is a sequence that corresponds to FIG. 7 and illustrates system-wide processing.

FIG. 9 is a sequence that corresponds to FIG. 7 and illustrates system-wide processing of system 1. FIG. 9 illustrates the system-wide processing of system 1 performed when the goal condition is satisfied. Note that the same processes as in the flowchart of FIG. 7 are assigned the same step numbers as in FIG. 7 and are not described in detail.

Terminal 40 of manager U1 generates a goal condition and transmits the goal condition to servers 10A etc. beforehand (Step S301). The goal condition includes a solicitation period and a goal amount, for example. Server 10A receives the transmitted goal condition, which is shared among servers 10A etc. (Step S100).

In Step S311, terminal 50 generates sign-up transaction data and transmits the generated sign-up transaction data to servers 10A etc. At this time, terminal 50 may transmit the generated sign-up transaction data to one or at least two of servers 10A etc.

Servers 10A etc. receive the sign-up transaction data transmitted and store this sign-up transaction data into the distributed ledgers (Steps S101 and S102). If determining that the deposit issuance condition is satisfied, servers 10A etc. generate deposit offering transaction data for issuing a deposit to participant U3 owning terminal 51 that is the transmission source of the sign-up transaction data, and store the generated deposit offering transaction data into the distributed ledgers (Steps S103 to S105). Upon expiry of the solicitation period, servers 10A etc. transmit a notification about the expiry of the solicitation period (Steps S106 and S107).

If the goal condition is satisfied, servers 10A etc. generate invalidation transaction data for invalidating the deposit already issued, and store the generated invalidation transaction data into the distributed ledgers (Steps S110 and S111).

Moreover, servers 10A etc. generate token offering transaction data for offering a token to the holder of the deposit, and store the generated token offering transaction data into the distributed ledgers (Steps S112 and S113).

Variation 1 of Embodiment

The following describes another configuration of the service management system, according to the present variation of the embodiment described above.

Figure 10:
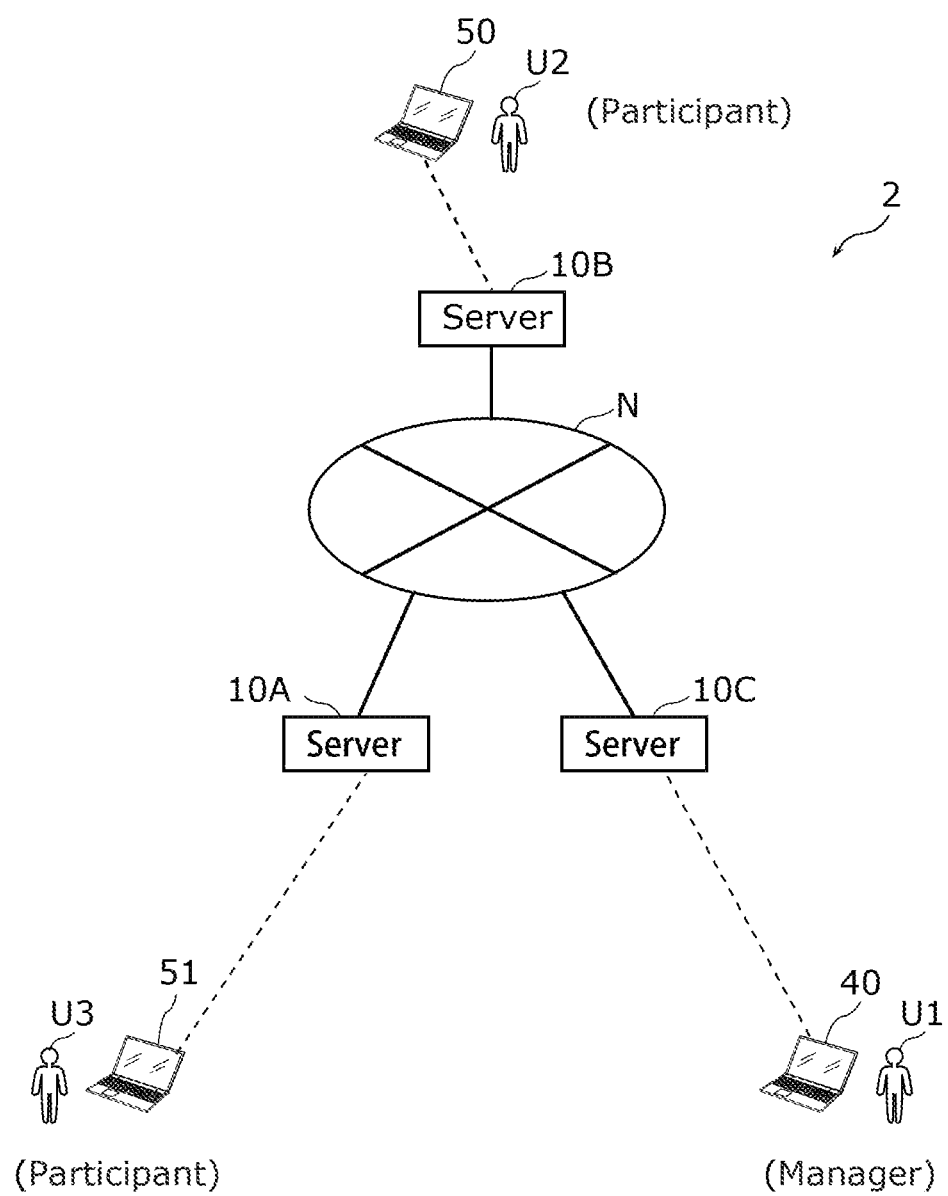
FIG. 10 is a schematic block diagram of a system according to Variation 1 of the Embodiment.

FIG. 10 is a schematic block diagram illustrating a configuration of system 2 according to the present variation.

As illustrated in FIG. 10, system 2 includes servers 10A, 10B, and 10C, and terminals 40, 50, and 51. These devices included in system 2 are communicably connected to each other via network N. Network N may use any kind of communication line or network. Examples include the Internet and a mobile phone carrier network.

In particular, servers 10A, 10B, and 10C of system 2 are connected to each other via network N. Server 10A is connected to terminal 51. Server 10B is connected to terminal 50. Server 10C is connected to terminal 40.

Such configuration may be used for system 2 run by a plurality of groups that have respective managed servers connected to each other via network N. For example, server 10A and terminal 51 belong to group A, server 10B and terminal 50 belong to group B, and server 10C and terminal 40 belong to group C.

Operations performed by servers 10A etc. and terminals 40 etc. are the same as those described in the embodiment above, and thus are omitted from the description.

Variation 2 of Embodiment

The following describes another configuration of the service management system, according to the present variation of the embodiment described above.

Figure 11:
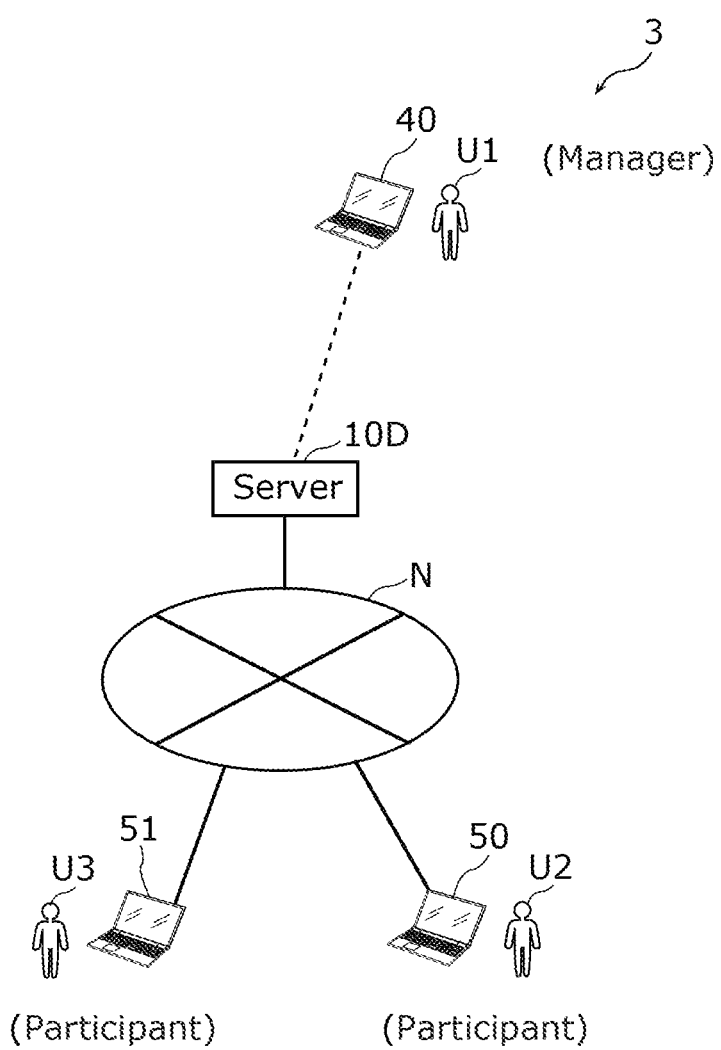
FIG. 11 is a schematic block diagram of a system according to Variation 2 of the Embodiment.

FIG. 11 is a schematic block diagram illustrating a configuration of system 3 according to the present variation.

As illustrated in FIG. 11, system 3 includes server 10D and terminals 40, 50, and 51. The devices included in system 3 are communicably connected to each other via network N. Network N may use any kind of communication line or network. Examples include the Internet and a mobile phone carrier network.

In particular, server 10D and terminals 50 and 51 of system 3 are connected to each other via network N. Server 10D is connected to terminal 40. In this case, terminals 50 and 51 operate as servers 10A etc. according to the embodiment described above.

Such configuration may be used for system 3 run by at least one group and at least one individual that have respective managed servers or terminals connected to each other via network N. For example, server 10D and terminal 40 belong to group D. System 3 is run by group D and individual participants U2 and U3.

Operations performed by server 10D and terminals 40 etc. are the same as those described in the embodiment above, and thus are omitted from the description.

Variation 3 of Embodiment

Figure 12:
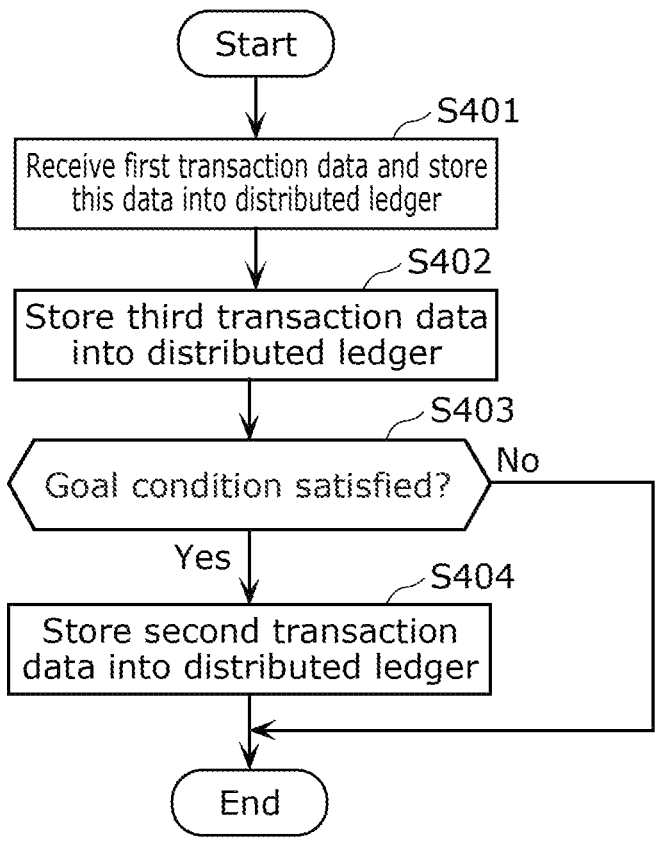
FIG. 12 is a flowchart illustrating processing performed by a server according to Variation 3 of the Embodiment.

FIG. 12 is a flowchart illustrating processing performed by a server according to the present variation. The flowchart of FIG. 12 is a control method executed by one of a plurality of servers included in a service management system, each of the plurality of servers including a distributed ledger.

The server receives first transaction data related to a sign-up for service and stores the first transaction data received into the distributed ledger included in each of the plurality of servers (Step S401). The service offers, if a goal condition predetermined for this service is satisfied, a token to a participant that is a user who signs up for the service.

If determining that the goal condition is satisfied (Yes in Step S403), the server stores, into the distributed ledger, second transaction data indicating that the user is offered a token predetermined for the service (Step S404).

The server stores third transaction data into the distributed ledger at a predetermined timing included in a period from when storing the first transaction data into the distributed ledger until when determining whether the goal condition is satisfied (Step S402). Here, the third transaction data indicates that the user is offered a deposit that is a temporary token predetermined for the service.

This enables the service management system to enhance power consumption efficiency of the system.

Figure 13:
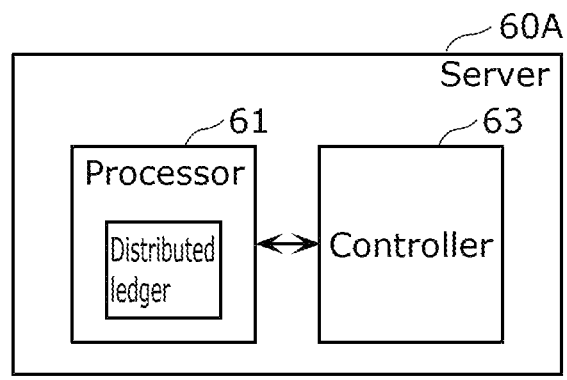
FIG. 13 is a schematic block diagram illustrating a configuration of the server according to Variation 3 of the Embodiment.

FIG. 13 is a schematic block diagram illustrating a configuration of the server according to the present variation.

As illustrated in FIG. 13, the service management system includes a plurality of servers each of which includes a distributed ledger. Server 60A among the plurality of servers includes processor 61 and controller 63.

Processor 61 receives first transaction data related to a sign-up for service and stores the first transaction data received into the distributed ledger included in each of the plurality of servers. The service offers, if a goal condition predetermined for this service is satisfied, a token to a participant that is a user who signs up for the service.

If determining that the goal condition is satisfied, controller 63 stores, into the distributed ledger, second transaction data indicating that the user is offered a token predetermined for the service. Controller 63 stores third transaction data into the distributed ledger at a predetermined timing included in a period from when storing the first transaction data into the distributed ledger until when determining whether the goal condition is satisfied. Here, the third transaction data indicates that the user is offered a deposit that is a temporary token predetermined for the service.

This enables the service management system to enhance power consumption efficiency of the system.

Complementary Remarks

A blockchain according to the embodiment above and variations is complementally described.

Figure 14:
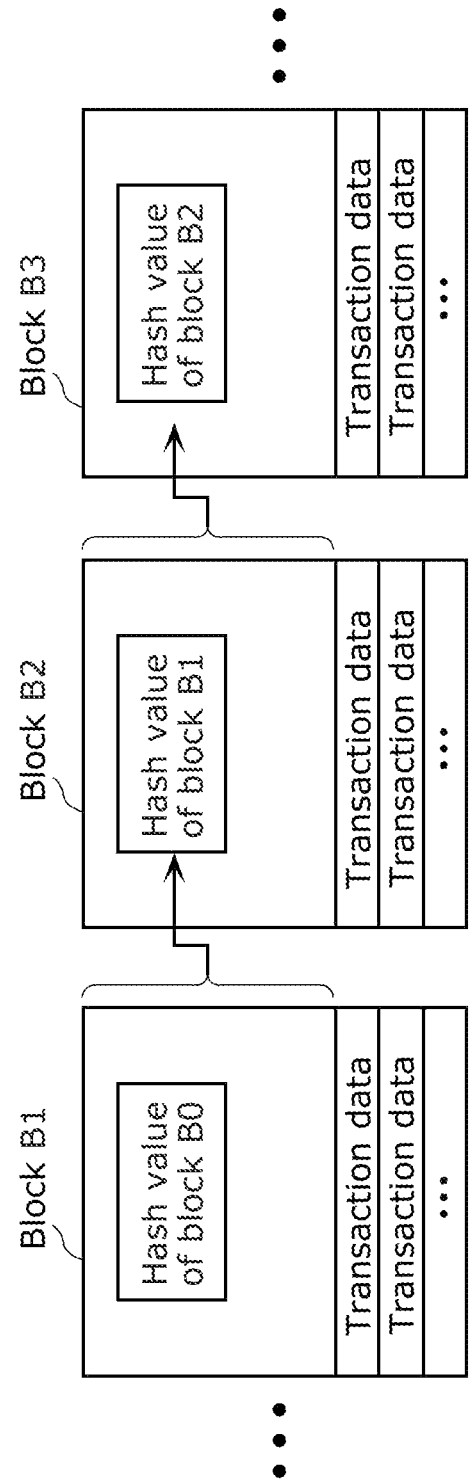
FIG. 14 illustrates a data structure of a blockchain.

FIG. 14 illustrates a data structure of a blockchain.

A blockchain includes blocks, each being a unit of recording, and forms a chain by linking the blocks together. Each of the blocks includes a plurality of pieces of transaction data and a hash value of an immediately preceding block. To be more specific, block B2 includes a hash value of block B1 that is the immediately preceding block. Then, a hash value calculated from the plurality of pieces of transaction data included in block B2 and the hash value of block B1 is contained as the hash value of block B2 in block B3. In this way, blocks contain the information of the preceding block as the hash value, forming a chain. This effectively prevents the recorded transaction data from falsification.

If the transaction data in the past is modified, the hash value of the block is different from the value before the modification. To make the falsified block appear correct, all the subsequent blocks need to be altered. Realistically speaking, this is extremely difficult. Such characteristics of blockchains assure resistance to falsification.

Figure 15:
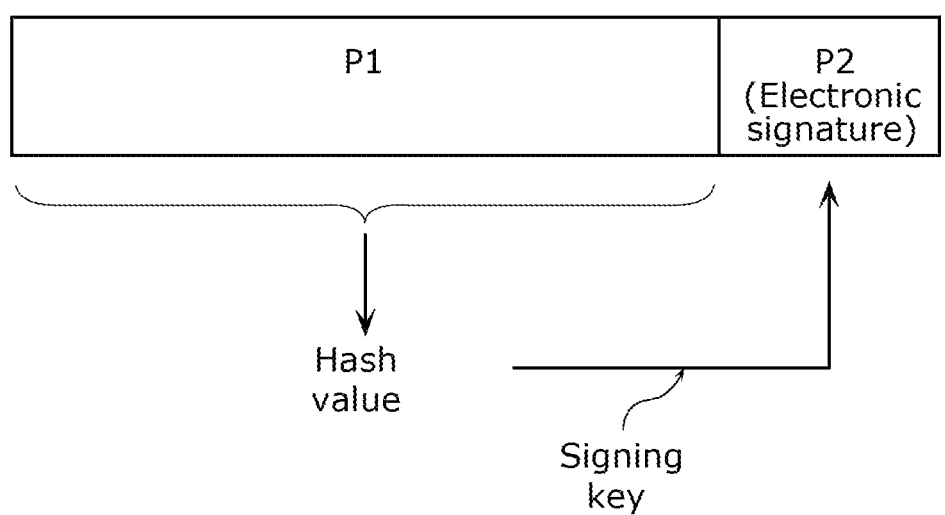
FIG. 15 illustrates a data structure of transaction data.

FIG. 15 illustrates a data structure of transaction data.

Transaction data illustrated in FIG. 15 includes transaction data boy P1 and electronic signature P2. Transaction data body P1 is a data body included in the transaction data. Electronic signature P2 is signed using a signing key of a creator of the transaction data. More specifically, electronic signature P2 is generated through encryption using a private key of the creator.

It is substantially impossible for the transaction data including electronic signature P2 to be falsified. This prevents the transaction data body from falsification.

As described above, the system offers, to the user, the deposit as the temporary token corresponding to a token that is value information to be offered in the future, in a period before the goal condition is achieved. The deposit may be managed in the distributed ledger to be used in the same or similar manner as the token is. This enables the system to offer the value information to the user in the period before the goal condition is achieved, thereby enhancing power consumption efficiency of the system. Thus, the control method according to the present disclosure is capable of enhancing the power consumption efficiency of the system.

Moreover, it is substantially impossible for the transaction data stored in the distributed ledger to be falsified. Thus, the management information related to the deposit offering is appropriately managed by the system. If the management information were to be falsified, this may cause inappropriate distribution of the value information, such as deposit or token. However, the control method according to the aspect of the present disclosure stores the management information into the distributed ledger, so that falsification is substantially impossible. Hence, the control method according to the aspect of the present disclosure also has an advantageous effect of appropriately managing the distribution of the value information, such as deposit or token.

Moreover, the system is further capable of offering the deposit to the offer recipient and thereby distributing among users the value information offered to the participant. Such distribution of the value information enables the system to further enhance the power consumption efficiency. Hence, the control method according to the aspect of the present disclosure is capable of further enhancing the power consumption efficiency of the system.

Furthermore, the system is capable of invalidating the deposit if the goal condition is unsatisfied, and thereby appropriately controlling the validity of the deposit. Hence, the control method according to the present disclosure is capable of appropriately managing the distribution of the value information as well as further enhancing the power consumption efficiency of the system.

Moreover, the system is capable of offering the token corresponding to the deposit if the goal condition is satisfied, and thus also performing management so that the deposit is converted into the token after the goal condition is satisfied. Hence, the control method according to the present disclosure is capable of further appropriately managing the distribution of the value information as well as further enhancing the power consumption efficiency of the system.

Furthermore, the system is capable of providing a notification that the goal condition is satisfied, and thereby encouraging action (that is, exchange) for converting the deposit into the token after the goal condition is satisfied. Hence, the control method according to the present disclosure is capable of further appropriately managing the distribution of the value information as well as further enhancing the power consumption efficiency of the system.

Moreover, the system is capable of performing, if the goal condition is satisfied, management so that the token converted from the deposit owned by the holder different from the participant appears to be offered from the participant. If the deposit held by the holder were to simply disappear, this may cause inappropriate distribution of the value information. Hence, the control method according to the present disclosure is capable of further appropriately managing the distribution of the value information as well as further enhancing the power consumption efficiency of the system.

Furthermore, the system is capable of performing management so that the number of times the deposit is offered does not exceed the predetermined number of times. This management limits a range of the deposit offering because the deposit is allowed to be used as a token only in a period before the goal condition is satisfied. Hence, the control method according to the present disclosure is capable of further appropriately managing the distribution of the value information as well as further enhancing the power consumption efficiency of the system.

Moreover, the system performs the deposit offering early and safely without any intervention of another person or another system. Hence, the control method according to the present disclosure is capable of performing the processing early and safely as well as enhancing the power consumption efficiency of the system.

Furthermore, the system stores the distributed ledger through the execution of the consensus algorithm. Hence, the control method according to the present disclosure more easily enables enhancement of the power consumption efficiency of the system by the execution of the consensus algorithm.

Moreover, in the above embodiment, the respective structural components may be implemented as dedicated hardware or may be realized by executing a software program suited to the respective structural components. Alternatively, the respective structural components may be implemented by a program executor such as a CPU or a processor reading out and executing the software program recorded in a recording medium such as a hard disk or a semiconductor memory. Here, the software for implementing the content management system and so forth in the above embodiment is a program such as that described below.

Specifically, the above program is program that causes a computer to execute a control method executed by one of a plurality of servers included in a service management system, each of the plurality of servers including a distributed ledger, the control method. The control method includes: receiving first transaction data that is transaction data related to a sign-up for service and storing the first transaction data received into the distributed ledger included in each of the plurality of servers, the service offering, if a goal condition predetermined for the service is satisfied, a token to a participant that is a user who signs up for the service; storing, into the distributed ledger, second transaction data that is transaction data indicating that the user is offered the token predetermined for the service, if it is determined that the goal condition is satisfied; and storing, into the distributed ledger, third transaction data that is transaction data indicating that the user is offered a deposit that is a temporary token predetermined for the service, at a predetermined timing included in a period from the storing of the first transaction data into the distributed ledger until when determination of whether the goal condition is satisfied is performed.

Although a fund management system according to one or more aspects has been described above based on exemplary embodiments, the present disclosure is not limited to the foregoing embodiments. Forms achieved by making various modifications to the above embodiments that can be conceived by those skilled in the art, as well forms achieved by combining structural components in different embodiments, so long as they do not materially depart from the spirit of the present disclosure, may be included in the one or more aspects.

INDUSTRIAL APPLICABILITY

The present disclosure is applicable to a service management system that manages service for offering a token to a participant.

The invention claimed is:

1. A control method executed by a server included in a service management system, the control method comprising:
receiving first transaction data that is transaction data related to a sign-up for service and storing the first transaction data received into a distributed ledger, the service offering, if a goal condition predetermined for the service is satisfied, a token to a participant that is a user who signs up for the service;
storing, into the distributed ledger, second transaction data that is transaction data indicating that the user is offered a deposit that is a temporary token predetermined for the service, at a predetermined timing included in a period from the storing of the first transaction data into the distributed ledger until when determination of whether the goal condition is satisfied is performed, the second transaction data being generated through encryption using a private key of a creator of the second transaction data;
after storing the second transaction data into the distributed ledger, determining whether or not the goal condition is satisfied;
when the determining determines that the goal condition is satisfied, (i) storing, into the distributed ledger, third transaction data that is transaction data for invalidating the deposit and (ii) converting the deposit into a true token different from the deposit and exchangeable for the service; and
when the determining determines that the goal condition is not satisfied, storing, into the distributed ledger, the third transaction data that is the transaction data for invalidating the deposit,
wherein the deposit is value information which (i) can be distributed among users including the user only in a period from issuance of the deposit until when the determining whether or not the goal condition is satisfied is performed and (ii) is managed in the distributed ledger in a same manner as the true token exchangeable for the service such that the value information is usable and managed by the distributed ledger in the period from issuance of the deposit until when the determining whether or not the goal condition is satisfied is performed.

2. The control method according to claim 1, further comprising:
after the storing of the second transaction data into the distributed ledger,
storing, into the distributed ledger, fourth transaction data that is transaction data indicating that the deposit is offered from a holder of the deposit to an offer recipient that receives the deposit.

3. The control method according to claim 2,
wherein the storing of the fourth transaction data into the distributed ledger includes limiting the storing of the fourth transaction data into the distributed ledger if a total number of times the deposit is offered exceeds a predetermined total number of times.

4. The control method according to claim 2,
wherein before the storing of the fourth transaction data into the distributed ledger, referring to a remaining number of uses of the deposit included in the fourth transaction data, and when the remaining number of uses is at least one, storing the fourth transaction data into the distributed ledger.

5. The control method according to claim 4,
wherein after the storing of the fourth transaction data into the distributed ledger, decrementing by one the remaining number of uses of the deposit related to the fourth transaction data.

6. The control method according to claim 1, further comprising:
when the determining determines that the goal condition is satisfied, storing, into the distributed ledger, fourth transaction data that is transaction data for offering a token corresponding to the deposit to a holder of the deposit.

7. The control method according to claim 1, further comprising:
when the determining determines that the goal condition is satisfied, notifying a holder of the deposit that the goal condition is satisfied.

8. The control method according to claim 1, further comprising:
when a holder of the deposit is not the participant and when the determining determines that the goal condition is not satisfied, storing, into the distributed ledger, fourth transaction data that is transaction data for offering a token corresponding to the deposit from the participant to the holder.

9. A non-transitory computer-readable recording medium having recorded thereon a program for causing a computer to execute the control method according to claim 1.

10. The control method according to claim 1,
wherein the deposit is issued when a predetermined number of pieces of the first transaction data are received or when an increase rate of a total number of pieces of the first transaction data received exceeds a predetermined rate.

11. The control method according to claim 1,
wherein, if it is determined that the goal condition is satisfied, storing, into the distributed ledger, fourth transaction data indicating that the user is offered a token predetermined for the service.

12. The control method according to claim 1, wherein
the converting of the deposit into the true token is performed by storing, into the distributed ledger, fourth transaction data indicating that a token corresponding to the deposit is offered.

13. A server included in a service management system, the server comprising:
a processor; and
a controller,
wherein the processor receives first transaction data related to a sign-up for service and stores the first transaction data received into a distributed ledger,
the service offers, if a goal condition predetermined for the service is satisfied, a token to a participant that is a user who signs up for the service,
the controller:
stores, into the distributed ledger, second transaction data indicating that the user is offered a deposit that is a temporary token predetermined for the service, at a predetermined timing included in a period from when storing the first transaction data into the distributed ledger until when determining whether the goal condition is satisfied, the second transaction data being generated through encryption using a private key of a creator of the second transaction data;
after storing the second transaction data into the distributed ledger, determining whether or not the goal condition is satisfied;
when the determining determines that the goal condition is satisfied, (i) storing, into the distributed ledger, third transaction data that is transaction data for invalidating the deposit and (ii) converting the deposit into a true token different from the deposit and exchangeable for the service; and
when the determining determines that the goal condition is not satisfied, storing, into the distributed ledger, the third transaction data that is the transaction data for invalidating the deposit, and
wherein the deposit is value information which (i) can be distributed among users including the user only in a period from issuance of the deposit until when the determining whether or not the goal condition is satisfied is performed and (ii) is managed in the distributed ledger in a same manner as the true token exchangeable for the service such that the value information is usable and managed by the distributed ledger in the period from issuance of the deposit until when the determining whether or not the goal condition is satisfied is performed.

* * * * *